US010027926B1

(12) United States Patent
Schirdewahn et al.

(10) Patent No.: US 10,027,926 B1
(45) Date of Patent: Jul. 17, 2018

(54) DYNAMICALLY ADDING CAMERAS OF MOBILE DEVICES FOR COLLABORATIVE SHARING BASED ON PROXIMITY

(71) Applicant: Cisco Technology, Inc., San Jose, CA (US)

(72) Inventors: Jochen Christof Schirdewahn, Stabekk (NO); John Knight Restrick, Jr., Montclair, NJ (US)

(73) Assignee: Cisco Technology, Inc., San Jose, CA (US)

( * ) Notice: Subject to any disclaimer, the term of this patent is extended or adjusted under 35 U.S.C. 154(b) by 0 days.

(21) Appl. No.: 15/581,114

(22) Filed: Apr. 28, 2017

(51) Int. Cl.
| | |
|---|---|
| *H04N 7/15* | (2006.01) |
| *H04N 7/14* | (2006.01) |
| *H04N 7/18* | (2006.01) |
| *H04W 12/06* | (2009.01) |
| *H04W 4/00* | (2018.01) |
| *H04W 4/04* | (2009.01) |
| *H04W 4/80* | (2018.01) |

(52) U.S. Cl.
CPC ............. *H04N 7/15* (2013.01); *H04N 7/147* (2013.01); *H04N 7/181* (2013.01); *H04W 4/008* (2013.01); *H04W 4/04* (2013.01); *H04W 4/80* (2018.02); *H04W 12/06* (2013.01)

(58) Field of Classification Search
None
See application file for complete search history.

(56) References Cited

U.S. PATENT DOCUMENTS

| | | | |
|---|---|---|---|
| 9,024,997 B2 | 5/2015 | Kumar et al. | |
| 9,179,097 B2 | 11/2015 | Kuscher et al. | |
| 9,237,307 B1 | 1/2016 | Vendrow | |
| 9,369,628 B2 | 6/2016 | Tian | |
| 9,407,869 B2* | 8/2016 | Goesnar | H04L 12/1818 |
| 2009/0319613 A1 | 12/2009 | Hjelm et al. | |
| 2012/0056971 A1* | 3/2012 | Kumar | H04M 3/567 348/14.02 |
| 2013/0106976 A1 | 5/2013 | Chu et al. | |
| 2013/0106977 A1* | 5/2013 | Chu | H04N 7/142 348/14.02 |
| 2013/0128052 A1* | 5/2013 | Catrein | H04N 5/232 348/159 |
| 2014/0168345 A1* | 6/2014 | Vernick | H04N 7/15 348/14.02 |
| 2014/0313282 A1* | 10/2014 | Ma | H04N 7/152 348/14.09 |
| 2016/0150187 A1 | 5/2016 | Fadili et al. | |
| 2016/0277708 A1 | 9/2016 | Rintel et al. | |
| 2016/0323542 A1* | 11/2016 | Kim | H04N 21/4126 |

* cited by examiner

*Primary Examiner* — Stella Woo
(74) *Attorney, Agent, or Firm* — Edell, Shapiro & Finnan, LLC

(57) ABSTRACT

In one embodiment, upon detection of a mobile device within a proximity of a video conference endpoint and authentication of the mobile device at a server managing the video conference endpoint, the server may receive information regarding a camera of the mobile device. The server may then receive the output of the camera from the mobile device. Finally, after receiving the output of the camera, the server may send the output of the camera to the video conference endpoint as part of media to be presented by the video conference endpoint. The server may also send the output of the camera to one or more other endpoints participating in a video conference managed by the server.

20 Claims, 9 Drawing Sheets

_US 10,027,926 B1_

DYNAMICALLY ADDING CAMERAS OF MOBILE DEVICES FOR COLLABORATIVE SHARING BASED ON PROXIMITY

TECHNICAL FIELD

The present disclosure relates to video conference systems.

BACKGROUND

A video conference system includes an endpoint that captures audio and video of participants in a room during a conference session, for example, and then transmits the audio and video to a conference server or to a "far-end" endpoint. The one or more cameras of a video conference endpoint may be fixed or, if adjustable, somewhat difficult to manipulate. In some instances, during a video conference session, the one or more cameras of the video conference endpoint may not be able to convey a sufficient contextual understanding of the events and topics of discussion at a video conference endpoint to the far-end participants at a far-end endpoint.

DESCRIPTION OF EXAMPLE EMBODIMENTS

Overview

In one embodiment, upon detection of a mobile device within a proximity of a video conference endpoint and authentication of the mobile device at a server managing the video conference endpoint, the server may receive information regarding a camera of the mobile device. The server may then receive the output of the camera from the mobile device. Finally, after receiving the output of the camera, the server may send the output of the camera to the video conference endpoint as part of media to be presented by the video conference endpoint. The server may also send the output of the camera to one or more other endpoints participating in a video conference managed by the server.

Example Embodiments

In one embodiment, a method is provided to dynamically add the camera of a mobile device in proximity to a video conference endpoint to the video conference system to enable the camera to be used to during a video conference session to send video to the endpoints participating in the video conference session. This gives participants local to the mobile device the ability to utilize the camera of the mobile device to output media that cannot be accomplished by the cameras that are part of a video conference endpoint. For example, participants may utilize the camera of a mobile device in proximity of a video conference endpoint to provide a close-up view of a document or an object. After detection of a mobile device in proximity of a video conference endpoint, outputs of the camera of the mobile device may be distributed to the one or more endpoints of a video conference session.

Figure 1:
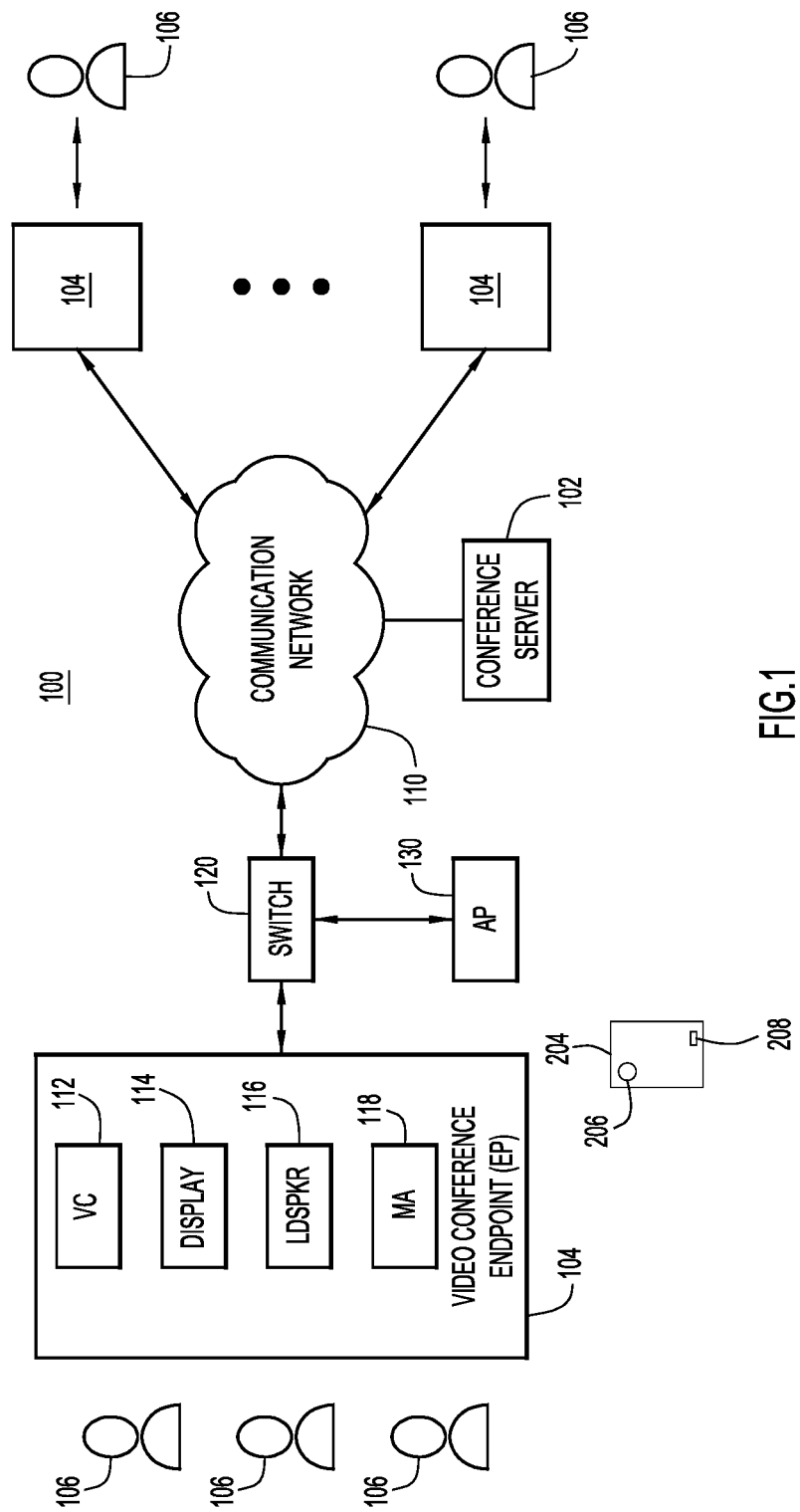
FIG. 1 is a block diagram of a video conference system in which a video conference endpoint dynamically adds the camera of a mobile device that is in proximity to the video conference endpoint, according to an example embodiment.

With reference to FIG. 1, there is depicted a block diagram of a video conference environment (system) 100 in which a video conference endpoint captures audio and video of participants local to the video conference endpoint to send the captured audio and video to far-end endpoints, while also receiving and presenting the captured audio and video of the far-end endpoints. Video conference environment 100 includes video conference endpoints 104 operated by local users/participants 106 and configured to establish audio-visual teleconference collaboration sessions with each other over a communication network 110 via network switch(es) 120. Communication network 110 may include one or more wide area networks (WANs), such as the Internet, and one or more local area networks (LANs). A conference server 102 may also be deployed to coordinate the routing of audio-video streams among the video conference endpoints, where routing among the endpoints 104 may include transcoding (e.g., to adapt to video standard, resolution, bitrate, etc.).

Each video conference endpoint 104 may include one or more video cameras (VC) 112, a video display 114, a loudspeaker (LDSPKR) 116, and a microphone array (MA) 118. Endpoints 104 may be wired or wireless communication devices equipped with the aforementioned components, such as, but not limited to laptop and tablet computers, smartphones, etc. In a transmit direction, endpoints 104 capture audio/video from their local participants 106 with MA 118/VC 112, encode the captured audio/video into data packets, and transmit the data packets to other endpoints or to the conference server 102. In a receive direction, endpoints 104 decode audio/video from data packets received from the conference server 102 or other endpoints and present the audio/video to their local participants 106 via loudspeaker 116/display 114.

Furthermore, as illustrated in FIG. 1, located in proximity to the video conference endpoint 104 is mobile device 204. The mobile device 204 may be any type of portable electronic device including, but not limited to, a personal digital assistant (PDA), tablet computer, laptop computer, cellular telephone, smartphone, etc. In addition, the mobile device 204 includes at least one camera 206 and at least one microphone 208. As explained in more detail below, the video conference endpoint 104 is configured to detect when the mobile device 204 is in proximity to the video conference endpoint 104, and add the camera(s) 206 of the mobile device 204 to the available media sources of the video conference endpoint 104.

Furthermore, located within and/or around each video conference endpoint 104 may be one or more wireless local area network (e.g., Wi-Fi®) access point(s) (AP) 130. AP 130 may be any device that routes wireless data between the devices (e.g., mobile device 204) and the network 110 of the video conference environment (system) 100. In one example, an AP is able to support Wi-Fi® in general, and the 802.11a, 802.11b, 802.11g, 802.11n, and/or 802.11ac wireless networking standards in particular. The AP 130 may be configured to relay the data and signals from the mobile device 204 in proximity of video conference endpoint 104 to the network 110, and ultimately to the video conference server 102, via network switch 130. Additionally, the AP 130 may be configured to provide wireless network access to the mobile device 204 once located within and/or around video conference endpoint 104.

Figure 2:
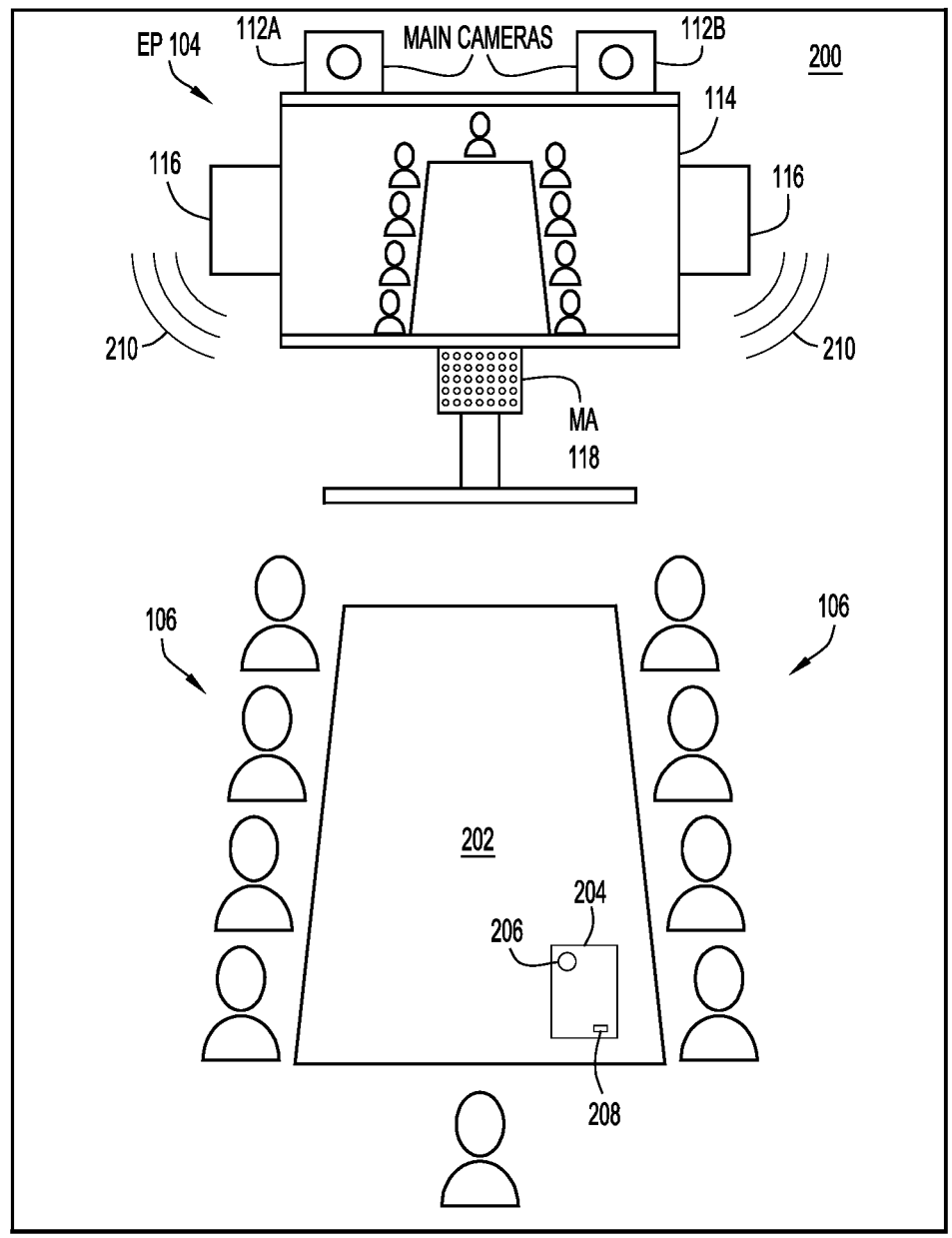
FIG. 2 is an illustration of video conference endpoint deployed in a conference room and a mobile device in proximity of the video conference endpoint, according to an example embodiment.

Referring now to FIG. 2, there is an illustration of video conference endpoint 104 deployed in a conference room 200 (depicted simplistically as an outline in FIG. 2), according to an embodiment. Video conference endpoint 104 includes main or center video cameras 112A and 112B positioned proximate and centered on display 114. Each of cameras 112A and 112B typically includes pan, tilt, and zoom (PTZ) features that may be implemented mechanically and/or digitally. Endpoint 104 controls the pan, tilt, and zoom features of each of the cameras 112A and 112B (collectively referred to as "cameras 112") to capture video of different views/scenes of participants 106 seated around a table 202 opposite from or facing (i.e., in front of) the cameras (and display 114). The combination of two video cameras depicted in FIG. 2 is only one example of many possible camera combinations that may be used, as would be appreciated by one of ordinary skill in the relevant arts having read the present description. As depicted in the example of FIG. 2, MA 118 is positioned adjacent to, and centered along, a bottom side of display 114 (i.e., below the display) so as to receive audio from participants 106 in room 200.

As illustrated in FIG. 2, located in proximity to the video conference endpoint 104 (e.g., within conference room 200) is mobile device 204. As previously explained, the mobile device 204 includes at least one camera 206 and at least one microphone 208. The camera 206 of mobile device 204 depicted in FIG. 2 is only one example of many possible camera combinations that may be equipped or connected with mobile device 204, as would be appreciated by one of ordinary skill in the relevant arts having read the present description.

In the example of FIG. 2, mobile device 204 may be detected by the video conference endpoint 104 when in proximity to the video conference endpoint 104. In one embodiment, the video conference endpoint 104 may detect a mobile device 204 through a process referred to as "ultrasound detection." The ultrasound detection uses a space-limited, inaudible, and unidirectional broadcast channel that conveys connection information to mobile devices 204 that are able to pick up the sound using, for example, the integrated microphone 208 of the mobile device 204. The connection information sent includes, but is not limited to, information that the mobile device 204 may use to wirelessly connect ("pair") to the video conference endpoint 104 or to establish communication with the video conference server 102 that is managing a video conference session in which the endpoint 104 is participating.

More specifically, the video conference endpoint 104 generates and transmits ultrasound pairing signals 210 using, for example, ultrasound waves, via loudspeakers 116. In certain embodiments, the signals 210 may include the network address of the video conference server 102 so that the mobile device 204 can connect to the video conference server 102 using any type of connection, such as a Wi-Fi® wireless network connection. In addition or alternatively, the signals 210 may include the network address of the video conference endpoint 104 so that the mobile device 204 can connect to the video conference endpoint 104 using another type of wireless connection.

In some embodiments, in addition to the network address, the ultrasound signals 210 may also contain a randomly generated code that changes periodically. The period at which the code changes may span from a few seconds to a few minutes, depending on security requirements. Once a mobile device 204 connects to the server 102 and/or to the endpoint 104, the mobile device 204 may be configured to pass the code back to the video conference endpoint 104. Failure by the mobile device 104 to return a correct code to the video conference endpoint 104 may cause the connection between the mobile device 204 and the server 102 and/or video conference endpoint 104 to be disabled. This ensures that mobile devices that know the address without being in the meeting room will not be able to reach the functionality of the endpoint 104 or the server 102, since they will not know the code that is only available to mobile devices 204 in proximity of the endpoint 104.

When a mobile device 204 receives the ultrasound pairing signals 210, the mobile device 204 decodes the signal to extract the network address. The mobile device 204 then uses the network address message to establish a connection with the video conference server 102 and/or with the video conference endpoint 104 to authenticate itself for purposes of completing the pairing process and becoming part of a video conference session. The connection of the mobile device 204 with the video conference endpoint 104 may be, for example, by way of a wireless network connection, a Bluetooth connection, etc. The connection of the mobile device 204 with the video conference server 102 may involve use of a wireless network connection to the endpoint 104 or to a wireless router (e.g., AP 130) in the conference room, which is in turn has wide area network connectivity to the server 102. Once this connection is established, the mobile device 204 may share the functionality of the camera 206 with the video conference system 100 as described below.

The level of the ultrasound pairing signals 210 in the conference room 200 should be high enough so that the ultrasound signals can reach most mobile devices 204 in the conference room 200 with good signal-to-noise-ratio. Otherwise, the connection information cannot be successfully recovered by the mobile devices 204. In general, the ultrasound signals 210 used for detecting the proximity of a mobile device 204 typically have a limited frequency range, e.g., between 20 and 22 kilohertz (kHz).

In other embodiments, the video conference endpoint 104 may utilize other short range wireless signals, such as, but not limited to, Bluetooth®, Zigbee, Z-Wave, infrared signals, radio frequency signals, etc., to detect a mobile device 204 within proximity of the video conference endpoint 104. In yet another embodiment, the video conference endpoint 104 or video conference server 102 may utilize location services or indoor positioning systems, like Wi-Fi® indoor positioning, to determine that a mobile device 204 is in proximity of the video conference endpoint 104.

Figure 3:
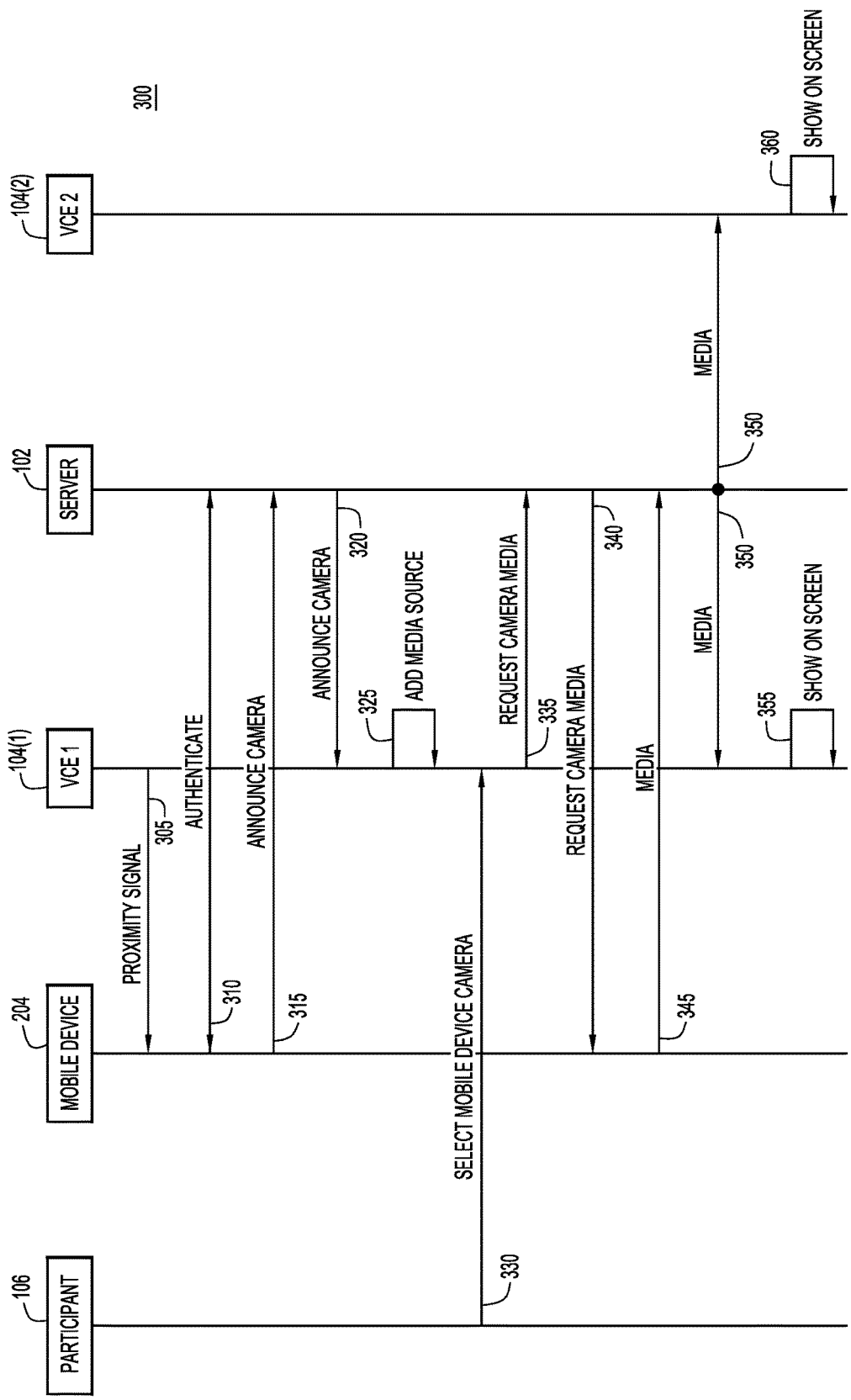
FIG. 3 is a sequence diagram depicting messages sent between, and operations performed by, various elements of a video conference system, according to a first example embodiment.

With reference to FIG. 3 and continued reference to FIGS. 1 and 2, illustrated is a sequence diagram 300 depicting, according to a first embodiment, further details of the operations performed by the participant 106, mobile device 204, video conference endpoints 104(1) and 104(2) (denoted VCE 1 and VCE 2), and the video conference server 102. At 305, the video conference endpoint 104(1) emits a proximity (pairing) signal that is received by the mobile device 204 belonging to a participant 106. As explained previously, the proximity signal may be an ultrasound pairing signal, a Bluetooth signal, a Wi-Fi signal, or any other short range wireless signal, as described above. Also as previously explained, the proximity signal sent by the video conference endpoint 104(1) may include the network address of the video conference server 102. At 310, the mobile device 204 establishes a communication session with the video conference server 102 and authenticates itself with the video conference server 102. The video conference server 102 may utilize any type of authentication process including, but not limited to, Password Authentication Protocol, Challenge Handshake Authentication Protocol, Extensible Authentication Protocol, Single Sign-On, etc.

Once the mobile device 204 has connected with the video conference server 102 and is authenticated, the mobile device 204, at 315, announces to the video conference server 102 the availability of the camera 206 that is equipped on, or connected with, the mobile device 204, where the announced camera 206 is capable of being used during a video conference session. As previously explained, a mobile device 204 may contain one or more cameras 206. At 315, the mobile device also announces to the video conference server 102 the encoding capabilities of the mobile device 204. At 320, the video conference server 102 then announces the camera 206 of the mobile device 204 to the video conference endpoint 104(1) with which the mobile device 204 is in proximity. At 325, the video conference endpoint 104 may then add the announced camera 206 of the mobile device 204 to the media sources available to the video conference endpoint 104(1) during a video conference session. The announced camera 206 may form a primary or secondary media source for the video conference endpoint 104(1). Thus, the video conference endpoint 104(1) may add the announced camera(s) 206 of the mobile device 204 to the list of available cameras (e.g., cameras 112A and/or 112B) for the video conference endpoint 104(1). In addition, the video conference endpoint 104(1) may add the announced camera(s) 206 of the mobile device 204 to a user interface that controls the components of the video conference endpoint 104(1), where participants 106 at the video conference endpoint 104(1) may be able to select the announced cameras 206 to output media via the announced camera(s) 206 of the mobile device 204.

At 330, a participant 106 at the video conference endpoint 104(1) selects the announced camera of the mobile device 204 as the media output of the video conference endpoint 104(1) to be transmitted/sent to the far-end video conference endpoints. The media output of the camera 206 of the mobile device 204 may include both video captured with the camera 206 and pictures/photos/images taken by the camera 206. The camera 206 and/or the mobile device 204 may encode the media output (e.g. H.264 for video outputs, .jpg for image outputs, etc.). In one embodiment, the participant 106 may select the camera 206 of the mobile device 204 via a user interface at the video conference endpoint 104(1). At 335, the video conference endpoint 104(1) sends the participant request for media output of the announced camera 206 of the mobile device 204 to the video conference server 102. In response to the video conference server 102 receiving the request from the video conference endpoint 104(1), the video conference server 102, at 340, requests from the mobile device 204 the media output of the announced camera 206 of the mobile device 204. The request sent by the video conference server 102 at 340 may include information regarding the required or requested signaling details (e.g., video standard, bit rate, resolution, frame rate, etc.). At 345, the mobile device 204 sends the media output of the announced camera 206 to the video conference server 102. The media output of the announced camera 206, particularly when the media output is a video output, may be encoded by the mobile device 204 prior to being sent to the video conference server 102.

At 350, the video conference server 102 sends/forwards/relays the media output of the announced camera 206 of the mobile device 206 to the video conference endpoints 104(1) and 104(2) that are participating in the video conference session managed by the video conference server 102. This includes the video conference endpoint 104(1) that the mobile device 204 is in proximity with, as well as other far-end video conference endpoints 104(2). The video conference server 102 may packet switch the media output (e.g., packet forwarding without media transcoding), may transcode the media output (e.g., to change the signaling details like video standard, bit rate, resolution, frame rate, etc.), or may transcode and packet switch the media output. At 355, the video conference endpoint 104(1) that detected the proximity of the mobile device 204 presents the media output of the announced camera 206 of the mobile device 204 on the display 114 for the participants 106 at the video conference endpoint 104(1) to view the media output. The video conference endpoint 104(1) may need to decode the media output at 355 prior to presenting the media output on the display 114. Furthermore, at 360, the one or more far-end video conference endpoints 104(2) present the media output of the announced camera 206 of the mobile device 204 on the display 114 to the far-end participants 106. The far-end endpoint(s) 104(2) may also need to decode the media output at 360 prior to presenting the media output on a display 114.

The operations at 305, 310, 315, 320, and 325 of FIG. 3 may be performed prior to the establishment of a video conference session or during a video conference session that is managed by the video conference server 102. In addition, these operations may be performed for each mobile device 204 detected in proximity of the video conference endpoint 104(1) (e.g., when there are multiple mobile devices 204 within proximity of the video conference endpoint 104(1)).

Figure 4:
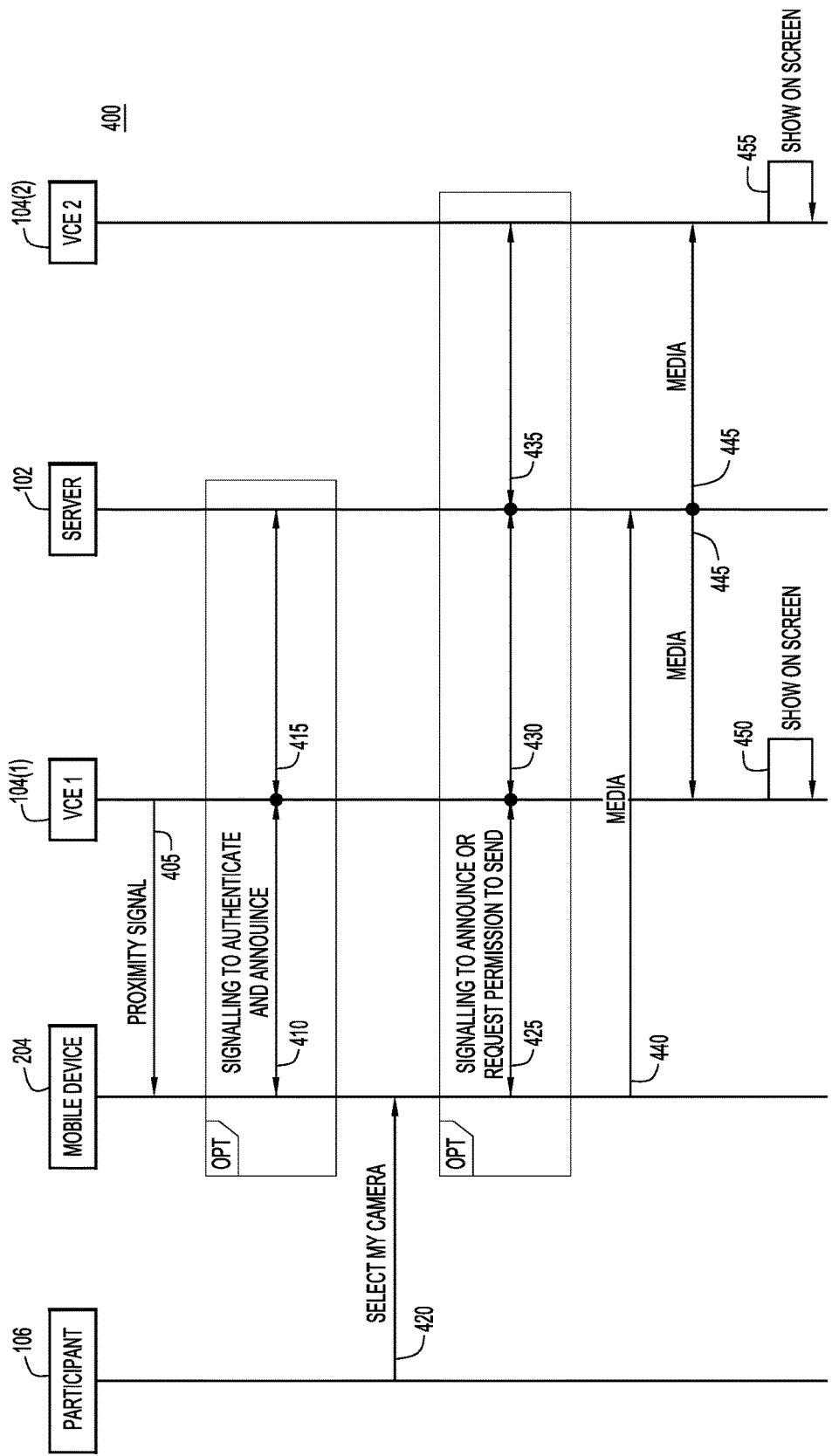
FIG. 4 is a sequence diagram depicting messages sent between, and operations performed by, various elements of a video conference system, according to a second example embodiment.

With reference to FIG. 4 and continued reference to FIGS. 1 and 2, illustrated is a sequence diagram 400 depicting, according to a second embodiment, further details of the operations performed by the participant 106, mobile device 204, video conference endpoints 104(1) and 104(2), and the video conference server 102. At 405, the video conference endpoint 104(1) emits a proximity (pairing) signal that is received by the mobile device 204 belonging to a participant 106. As explained previously, the proximity signal may be an ultrasound signal, a Bluetooth signal, a Wi-Fi signal, or any other short range wireless signal. The proximity signal sent by the video conference endpoint 104 may include the network address of the video conference endpoint 104(1) so that, at 410, the mobile device 204 may establish a communication channel with the video conference endpoint 104(1) and send authentication information to the video conference endpoint 104. Also at 410, the mobile device 204 may announce the camera(s) 206 that are equipped on, or connected with, the mobile device 204 and are capable of being used during a video conference session. The mobile device 204 may also send, at 410, the encoding capabilities of the mobile device 204. At 415, the video conference endpoint 104(1) may send the authentication information, camera announcement information, and encoding abilities of the mobile device 204 to the video conference server 102 so that the video conference server 102 may authenticate the mobile device 204. The video conference server 102 may utilize any type of authentication process including, but not limited to, Password Authentication Protocol, Challenge Handshake Authentication Protocol, Extensible Authentication Protocol, Single Sign-On, etc. In addition, at 415, once the video conference server 102 authenticates the mobile device 204, the video conference server 102 may indicate to the video conference endpoint 104(1) that the mobile device 204 has been authenticated to enable the video conference endpoint 104(1) to add the announced camera(s) 206 of the mobile device 204 to the list of available cameras (e.g., cameras 112A and/or 112B) for the video conference endpoint 104(1).

At 420, a participant 106 at the video conference endpoint 104(1) selects, on the mobile device 204, the announced camera 206 of the mobile device 204 as the media output of the video conference endpoint 104(1). As previously explained, the media output of the camera 206 of the mobile device 204 may include either videos captured with the camera 206 or pictures/photos/image taken by the camera 206. The camera 206 and/or the mobile device 204 may encode the media output (e.g. H.264 for video outputs, .jpg for image outputs, etc.). At 425, the mobile device 204 communicates with the video conference endpoint 104(1) to announce or request permission to send the media output of the mobile device 204 to the conference server 102. The announcement or request at 425 may include information that conveys that the announced camera 206 of the mobile device 204 has been requested by a participant 106, while also requesting, from the video conference endpoint 104(1) the encoding requirements and the signaling details required to utilize the media output during the video conference session. The video conference endpoint 104(1) may send this request to the video conference server 102 at 430, where the video conference server 102 then, at 435 may request the encoding requirements and signaling details from each of the far-end endpoint(s) 104(2). Once the video conference server 102 receives, at 435, the encoding and signaling detail information from the far-end endpoint(s) 104(2) that is best suited for the endpoint(s) 104(2), and once the video conference server 102 relays this information to the video conference endpoint 104(1) in proximity with the mobile device 204 at 430, the video conference endpoint 104(1) may send the encoding and signaling detail information to the mobile device 204 at 425.

At 440, the mobile device 204 sends the media output of the announced camera 206 to the video conference server 102, where the media output is in accordance with the required encoding and signaling detail information. At 445, the video conference server 102 sends/distributes/relays the media output of the announced camera 206 of the mobile device 206 to the video conference endpoints that are participating in the video conference session managed by the video conference server 102. This includes the video conference endpoint 104(1) that the mobile device 204 is in proximity with, as well as other far-end video conference endpoint(s) 104(2). The video conference server 102 may packet switch the media output (e.g., packet forwarding without media transcoding), may transcode the media output (e.g., to change the signaling details like video standard, bit rate, resolution, frame rate, etc.), or may transcode and packet switch the media output. At 450, the video conference endpoint 104(1) that detected the proximity of the mobile device 204 presents the media output of the announced camera 206 of the mobile device 204 on the display 114 for the participants 106 at the video conference endpoint 104(1) to view the media output. The video conference endpoint 104(1) may need to decode the media output at 450 prior to presenting the media output on the display 114. Furthermore, at 455, the one or more far-end video conference endpoint(s) 104(2) present the media output of the announced camera 206 of the mobile device 204 on the display 114 to the far-end participants 106. The far-end endpoints 104 may also need to decode the media output at 455 prior to presenting the media output on the display 114.

The operations performed at 405, 410, and 415 of FIG. 4 may be performed prior to the establishment of a video conference session or during a video conference session that is managed by the video conference server 102. In addition, these operations may be performed for each mobile device 204 detected in proximity of the video conference endpoint 104(1) (e.g., when there are multiple mobile devices 204 within proximity of the video conference endpoint 104(1)).

Figure 5:
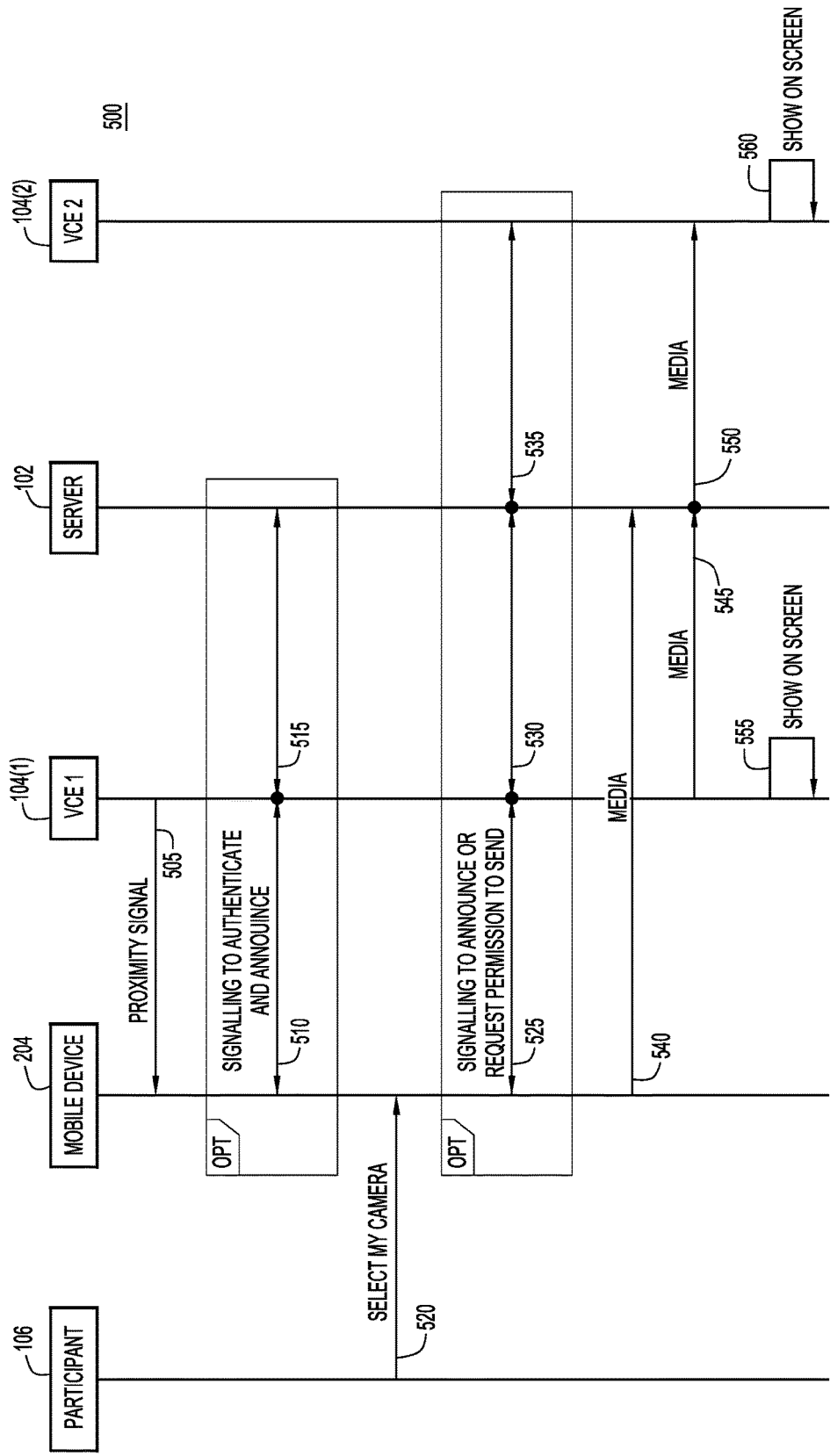
FIG. 5 is a sequence diagram depicting messages sent between, and operations performed by, various elements of a video conference system, according to a third example embodiment.

With reference to FIG. 5 and further reference to FIGS. 1 and 2, illustrated is a sequence diagram 500 depicting, according to a third embodiment, further details of the operations performed by the participant 106, mobile device 204, video conference endpoints 104(1) and 104(2), and the video conference server 102. At 505, the video conference endpoint 104(1) emits a proximity (pairing) signal that is received by the mobile device 204 belonging to a participant 106. As explained previously, the proximity signal may be an ultrasound signal, a Bluetooth signal, a Wi-Fi signal, or any other short range wireless signal. The proximity signal sent by the video conference endpoint 104(1) may include the network address of the video conference endpoint 104 so that, at 510, the mobile device 204 may establish a communication channel with the video conference endpoint 104(1) and send authentication information to the video conference endpoint 104(1). Also at 510, the mobile device 204 may announce the camera(s) 206 that are equipped on, or connected with, the mobile device 204 and are capable of being used during a video conference session. The mobile device 204 may also send, at 510, the encoding capabilities of the mobile device 204. At 515, the video conference endpoint 104(1) may send the authentication information, camera announcement information, and encoding abilities of the mobile device 204 to the video conference server 102 so that the video conference server 102 may authenticate the mobile device 204. The video conference server 102 may utilize any type of authentication process including, but not limited to, Password Authentication Protocol, Challenge Handshake Authentication Protocol, Extensible Authentication Protocol, Single Sign-On, etc. In addition, at 515, once the video conference server 102 authenticates the mobile device 204, the video conference server 102 may indicate to the video conference endpoint 104(1) that the mobile device 204 has been authenticated to enable the video conference endpoint 104(1) to add the announced cameras 206 of the mobile device 204 to the list of available cameras (e.g., cameras 112A and/or 112B) for the video conference endpoint 104(1).

At 520, a participant 106 selects, on the mobile device 204 the announced camera 206 of the mobile device 204 as the media output of the video conference endpoint 104(1). As previously explained, the media output of the camera 206 of the mobile device 204 may include either videos captured with the camera 206 or pictures/photos/images taken by the camera 206. The camera 206 and/or the mobile device 204 may encode the media output (e.g. H.264 for video outputs, .jpg for image outputs, etc.). At 525, the mobile device 204 may communicate with the video conference endpoint 104(1) to announce or request permission to utilize the media output of the mobile device 204 during the video conference session. The announcement or request at 525 may include information that conveys that the announced camera 206 of the mobile device 204 has been requested by a participant 106, while also requesting, from the video conference endpoint 104(1) the encoding requirements and the signaling details required to utilize the media output during the video conference session. The video conference endpoint 104(1) sends this request to the video conference server 102 at 530, where the video conference server 102 then, at 535 requests the encoding requirements and signaling details from each of the far-end endpoint(s) 104(2). Once the video conference server 102 receives, at 535, the encoding and signaling detail information from the far-end endpoint(s) 104(2) that is best suited for the endpoint(s) 104(2), and once the video conference server 102 relays this information to the video conference endpoint 104(1) in proximity with the mobile device 204 at 530, the video conference endpoint 104(1) sends the encoding and signaling detail information to the mobile device 204 at 525.

At 540, the mobile device 204 sends the media output of the announced camera 206 to the video conference endpoint 104(1), where the media output is in accordance with the required encoding and signaling detail information. At 545, the video conference endpoint 104(1) sends/forwards/relays the media output of the announced camera 206 of the mobile device 206 to the video conference server 102, and the video conference server 102, at 550, sends/forwards/relays the media output to the far-end endpoint(s) 104(2) that are participating in the video conference session. The video conference server 102 and the video conference endpoint 104(1) may packet switch the media output (e.g., packet forwarding without media transcoding), may transcode the media output (e.g., to change the signaling details like video standard, bit rate, resolution, frame rate, etc.), or may transcode and packet switch the media output when sending/forwarding the media output. At 555, the video conference endpoint 104(1) that detected the proximity of the mobile device 204 presents the media output of the announced camera 206 of the mobile device 204 on the display 114 for the participants 106 at the video conference endpoint 104(1) to view the media output. Simultaneously, at 560, the one or more far-end video conference endpoint(s) 104(2) present the media output of the announced camera 206 of the mobile device 204 on the display 114 to the far-end participants 106. The video conference endpoint 104(1) and the far-end endpoint(s) 104(2) may need to decode the media output at 555 and 560, respectively, prior to presenting the media output on the displays 114.

The operations performed at 505, 510, and 515 of FIG. 5 may be performed prior to the establishment of a video conference session or during a video conference session that is managed by the video conference server 102. In addition, these operations may be performed for each mobile device 204 detected in proximity of the video conference endpoint 104(1) (e.g., when there are multiple mobile devices 204 within proximity of the video conference endpoint 104(1)).

Figure 6:
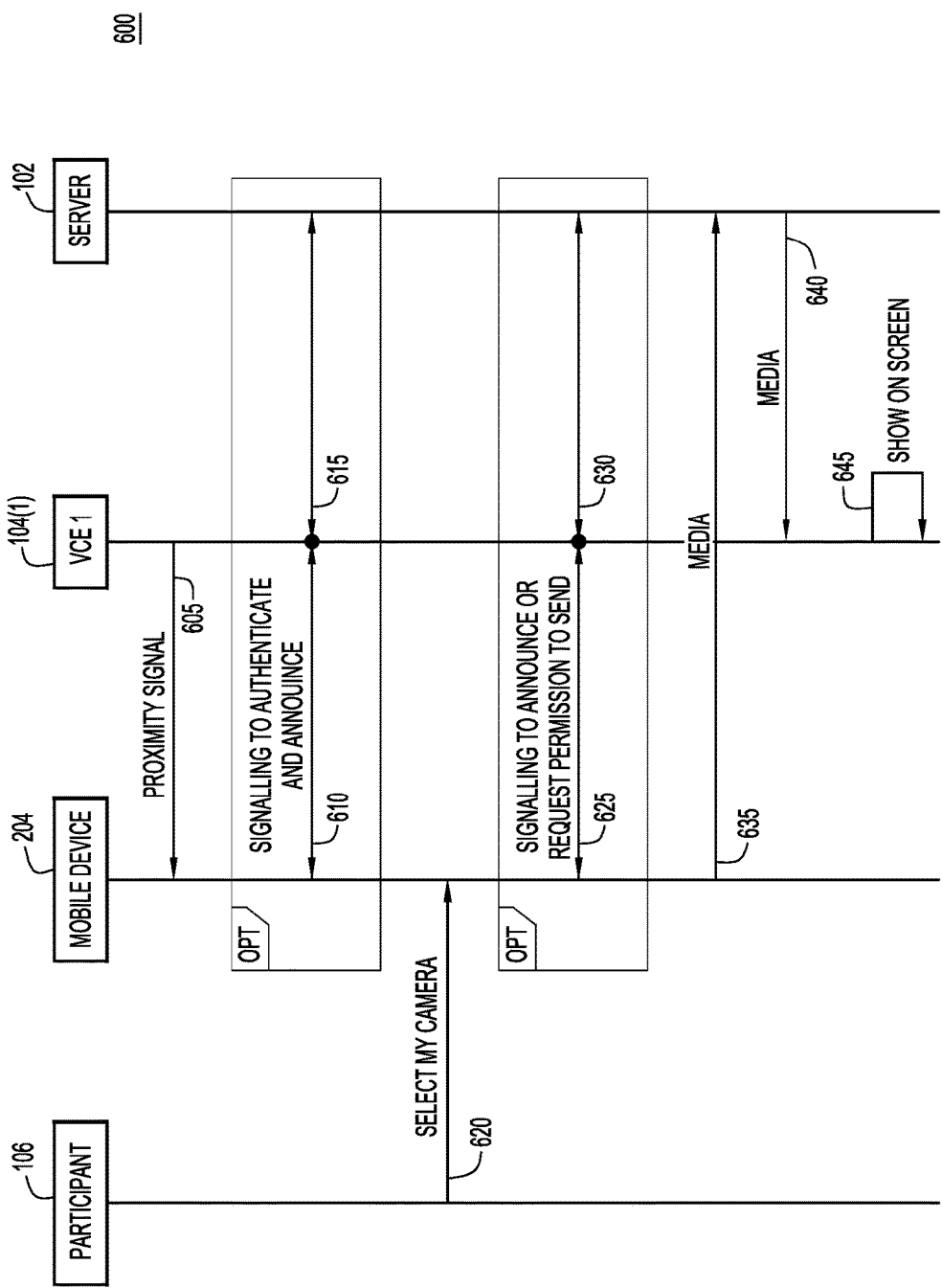
FIG. 6 is a sequence diagram depicting messages sent between, and operations performed by, various elements of a video conference system, according to a fourth example embodiment.

With reference to FIG. 6 and further reference to FIGS. 1 and 2, illustrated is a sequence diagram 600 depicting, according to a fourth embodiment, further details of the operations performed by the participant 106, mobile device 204, the video conference endpoint 104(1), and the video conference server 102. At 605, the video conference endpoint 104(1) emits a proximity (pairing) signal that is received by the mobile device 204 belonging to a participant 106. As explained previously, the proximity signal may be an ultrasound signal, a Bluetooth signal, a Wi-Fi signal, or any other short range wireless signal. The proximity signal sent by the video conference endpoint 104(1) may include the network address of the video conference endpoint 104 so that, at 610, the mobile device 204 may establish a communication channel with the video conference endpoint 104(1) and send authentication information to the video conference endpoint 104(1). Also at 610, the mobile device 204 may announce the cameras 206 that are equipped on, or connected with, the mobile device 204 and are capable of being used during a video conference session. The mobile device 204 may also send, at 610, the encoding capabilities of the mobile device 204. At 615, the video conference endpoint 104(1) sends the authentication information, camera announcement information, and encoding abilities of the mobile device 204 to the video conference server 102 so that the video conference server 102 may authenticate the mobile device 204. As explained previously, the video conference server 102 may utilize any type of authentication process including, but not limited to, Password Authentication Protocol, Challenge Handshake Authentication Protocol, Extensible Authentication Protocol, Single Sign-On, etc. In addition, at 615, once the video conference server 102 authenticates the mobile device 204, the video conference server 102 may indicate to the video conference endpoint 104(1) that the mobile device 204 has been authenticated to enable the video conference endpoint 104(1) to add the announced cameras 206 of the mobile device 204 to the list of available cameras (e.g., cameras 112A and/or 112B) for the video conference endpoint 104(1).

At 620, a participant 106 at the video conference endpoint 104(1) selects, on the mobile device 204 the announced camera 206 of the mobile device 204 as the media output of the video conference endpoint 104(1). As previously explained, the media output of the camera 206 of the mobile device 204 may include either videos captured with the camera 206 or pictures/photos/images taken by the camera 206. The camera 206 and/or the mobile device 204 may encode the media output (e.g. H.264 for video outputs, .jpg for image outputs, etc.). At 625, the mobile device 204 communicates with the video conference endpoint 104(1) to announce or request permission to utilize the media output of the mobile device 204. The announcement or request at 625 may include information that conveys that the announced camera 206 of the mobile device 204 has been requested by a participant 106, while also requesting, from the video conference endpoint 104(1) the encoding requirements and the signaling details required to utilize the media output during the video conference session. At 630, the video conference endpoint 104(1) sends this request to the video conference server 102, which may respond with any required encoding and signaling detail information. The video conference endpoint 104(1), at 625, may send the encoding and signaling detail information to the mobile device 204.

At 635, the mobile device 204 sends the media output of the announced camera 206 to the video conference server 102, where the media output is in accordance with the required encoding and signaling detail information. At 640, the video conference server 102 sends/forwards/relays the media output of the announced camera 206 of the mobile device 206 to the video conference endpoint 104(1). Unlike the embodiments illustrated in FIGS. 3 and 4, in the embodiment illustrated in FIG. 6, only the video conference endpoint 104(1) with which the mobile device 204 is in proximity is participating in the video conference session (i.e., there are no far-end endpoints and far-end participants that are participating in the video conference session). As previously explained, when sending/forwarding the media output, the video conference server 102 may packet switch the media output (e.g., packet forwarding without media transcoding), may transcode the media output (e.g., to change the signaling details like video standard, bit rate, resolution, frame rate, etc.), or may transcode and packet switch the media output. At 645, the video conference endpoint 104(1) presents the media output of the announced camera 206 of the mobile device 204 on the display 114 for the participants 106 at the video conference endpoint 104(1) to view the media output. The video conference endpoint 104(1) may need to decode the media output at 645 prior to presenting the media output on the displays 114.

The operations performed at 605, 610, and 615 of FIG. 6 may be performed prior to the establishment of a video conference session or during a video conference session that is managed by the video conference server 102. In addition, these operations may be performed for each mobile device 204 detected in proximity of the video conference endpoint 104(1) (e.g., when there are multiple mobile devices 204 within proximity of the video conference endpoint 104(1)).

Figure 7:
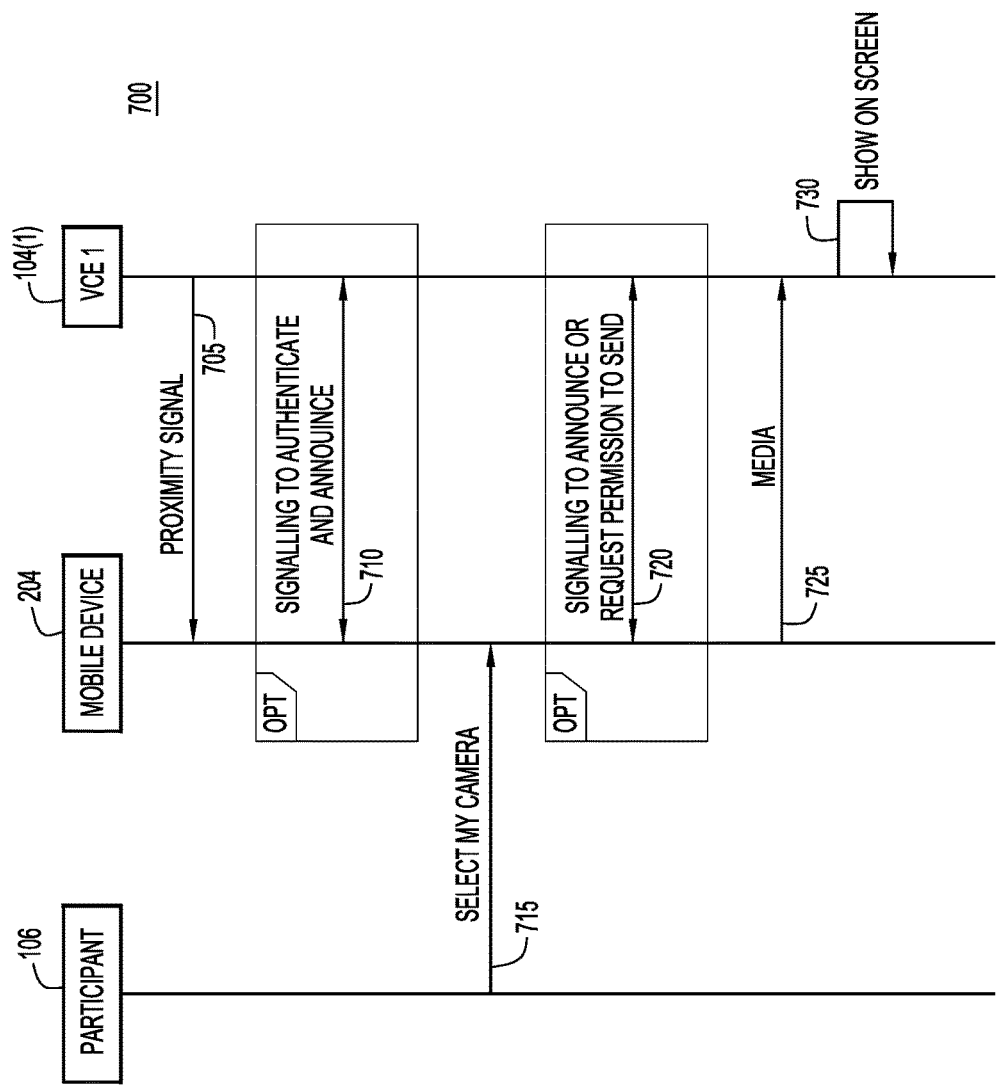
FIG. 7 is a sequence diagram depicting messages sent between, and operations performed by, various elements of a video conference system, according to a fifth example embodiment.

With reference to FIG. 7 and further reference to FIGS. 1 and 2, illustrated is a sequence diagram 700 depicting, according to a fifth embodiment, further details of the operations performed by the participant 106, mobile device 204, and the video conference endpoint 104(1). At 705, the video conference endpoint 104(1) emits a proximity signal that is received by the mobile device 204 belonging to a participant 106. As explained previously, the proximity signal may be an ultrasound signal, a Bluetooth signal, a Wi-Fi signal, or any other short range wireless signal. The proximity signal sent by the video conference endpoint 104(1) may include the network address of the video conference endpoint 104(1) so that, at 710, the mobile device 204 may establish a communication channel with the video conference endpoint 104(1) and send authentication information to the video conference endpoint 104(1). Also at 710, the mobile device 204 may announce the camera(s) 206 that are equipped on, or connected with, the mobile device 204 and are capable of being used during a video conference session. The mobile device 204 may also send, at 710, the encoding capabilities of the mobile device 204. In addition, at 710, the video conference endpoint 104(1) may authenticate the mobile device 204 and indicate, to the mobile device 204, that it has been authenticated. As explained previously, the video conference endpoint 104(1) may utilize any type of authentication process including, but not limited to, Password Authentication Protocol, Challenge Handshake Authentication Protocol, Extensible Authentication Protocol, Single Sign-On, etc. The video conference endpoint 104(1) may also, at 710, added the announced cameras 206 to the list of available cameras (e.g., cameras 112A and/or 112B) for the video conference endpoint 104.

At 715, a participant 106 at the video conference endpoint 104(1) selects, on the mobile device 204, the announced camera 206 of the mobile device 204 as the media output of the video conference endpoint 104(1). As previously explained, the media output of the camera 206 of the mobile device 204 may include both video captured with the camera 206 and pictures/photos/images taken by the camera 206. The camera 206 and/or the mobile device 204 may encode the media output (e.g. H.264 for video outputs, .jpg for image outputs, etc.). At 720, the mobile device 204 communicates with the video conference endpoint 104(1) to announce or request permission to utilize the media output of the mobile device 204. The announcement or request at 720 may include information that conveys that the announced camera 206 of the mobile device 204 has been requested by a participant 106, while also requesting, from the video conference endpoint 104(1) the encoding requirements and the signaling details required to utilize the media output. The video conference endpoint 104 may respond to the mobile device 204, at 720, with any required encoding and signaling detail information.

At 725, the mobile device 204 sends the media output of the announced camera 206 to the video conference endpoint 104(1), where the media output is in accordance with the required encoding and signaling detail information. Like the embodiment illustrated in FIG. 6, only the video conference endpoint 104(1) with which the mobile device 204 is in proximity is participating in the video conference session (i.e., there are no far-end endpoints and far-end participants that are participating in the video conference session). At 730, the video conference endpoint 104(1) that detected the proximity of the mobile device 204 presents the media output of the announced camera 206 of the mobile device 204 on the display 114 for the participants 106 at the video conference endpoint 104(1) to view the media output. The video conference endpoint 104(1) may need to decode the media output at 730 prior to presenting the media output on the displays 114.

The operations performed at 705 and 710 of FIG. 7 may be performed prior to the establishment of a video conference session or during a video conference session at the video conference endpoint 104. In addition, these operations may be performed for each mobile device 204 detected in proximity of the video conference endpoint 104(1) (e.g., when there are multiple mobile devices 204 within proximity of the video conference endpoint 104(1)).

Figure 8:
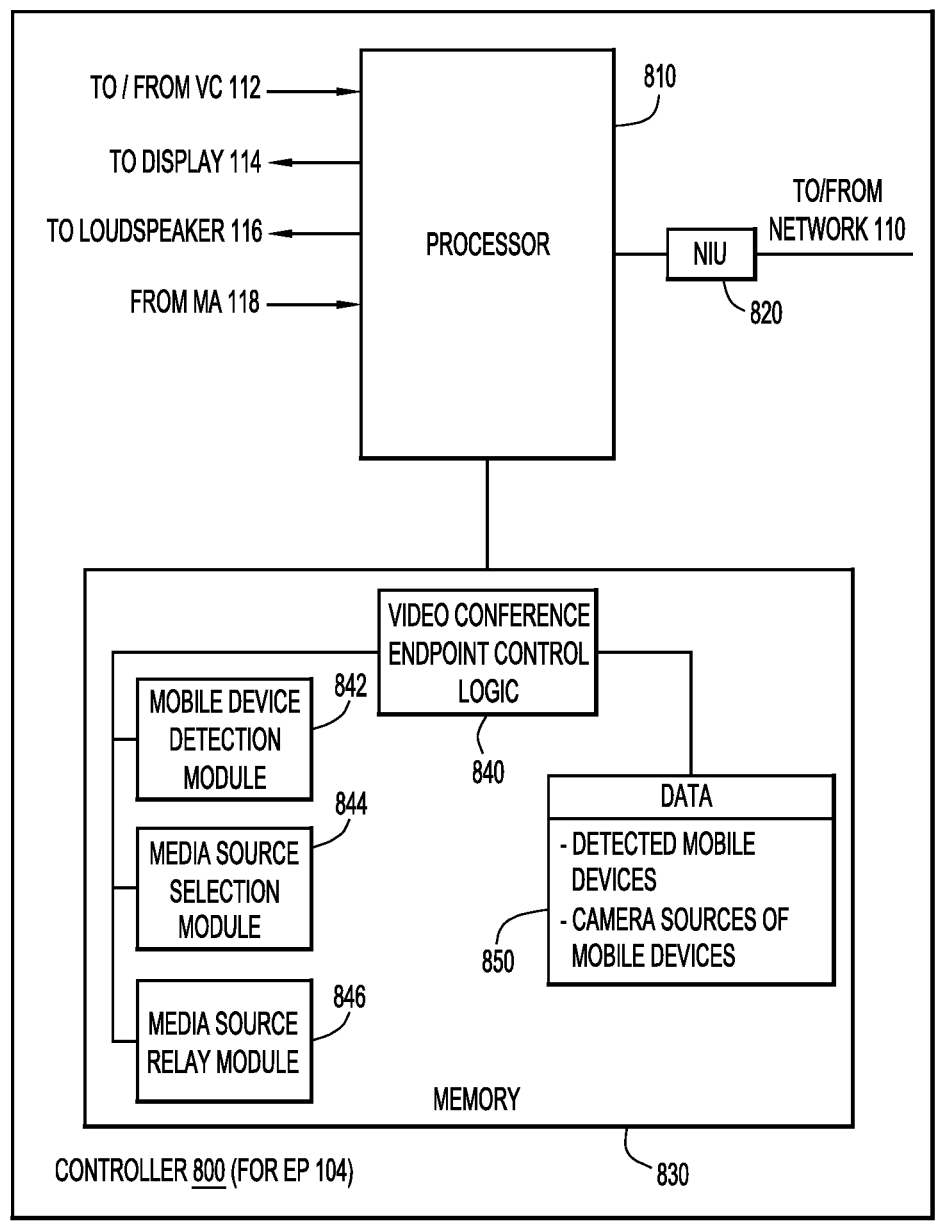
FIG. 8 is a block diagram of a controller of the video conference endpoint, wherein the controller is configured to perform the techniques presented herein, according to an example embodiment.

Reference is now made to FIG. 8, which shows an example block diagram of a controller 800 of video conference endpoint 104 configured to perform the techniques for dynamically adding cameras of mobile devices in proximity to the video conference endpoint 104 according to the embodiments described herein. There are numerous possible configurations for controller 800 and FIG. 8 is meant to be an example. Controller 800 includes a processor 810, a network interface unit 820, and memory 830. The network interface (I/F) unit (NIU) 820 is, for example, an Ethernet card or other interface device that allows the controller 800 to communicate over communication network 110. Network I/F unit 820 may include wired and/or wireless connection capability.

Processor 810 may include a collection of microcontrollers and/or microprocessors, for example, each configured to execute respective software instructions stored in the memory 830. The collection of microcontrollers may include, for example: a video controller to receive, send, and process video signals related to display 114 and video cameras 112; an audio processor to receive, send, and process audio signals related to loudspeaker 116 and MA 118; and a high-level controller to provide overall control. Processor 810 may send pan, tilt, and zoom commands to video cameras 112, which is responsive to the commands as would be appreciated by one of ordinary skill in the relevant art. Portions of memory 830 (and the instruction therein) may be integrated with processor 810. In the transmit direction, processor 810 encodes audio/video captured by MA 118/VC 112/camera 206 of mobile device 204, encodes the captured audio/video into data packets, and causes the encoded data packets to be transmitted to communication network 110. In a receive direction, processor 810 decodes audio/video from data packets received from communication network 110 and causes the audio/video to be presented to local participants 106 via loudspeaker 116/display 114. As used herein, the terms "audio" and "sound" are synonymous and interchangeable.

The memory 830 may include read only memory (ROM), random access memory (RAM), magnetic disk storage media devices, optical storage media devices, flash memory devices, electrical, optical, or other physical/tangible (e.g., non-transitory) memory storage devices. Thus, in general, the memory 830 may comprise one or more computer readable storage media (e.g., a memory device) encoded with software comprising computer executable instructions and when the software is executed (by the processor 810) it is operable to perform the operations described herein. For example, the memory 830 stores or is encoded with instructions for Video Conference Endpoint Control logic 840 to perform overall control of endpoint 104 and operations described herein for adding cameras of mobile devices in proximity of the video conference endpoint 104. Video Conference Endpoint Control logic 840 includes a Mobile Device Detection Module 842 to detect mobile devices in proximity of the video conference endpoint 104 using ultrasound signals or short range wireless signals, a Media Source Selection Module 844 to select and switch between the media source of the cameras of the proximate mobile devices and the cameras 112 of the video conference endpoint 104, and a Media Source Relay Module 846 to send/forward media outputs of the mobile devices to the video conference server 102.

In addition, memory 830 stores data 850 used and generated by logic/modules/detectors 840-846, including, but not limited to: information associated with detected mobile devices (e.g., mobile device identification, authentication, etc.); and information associated with the cameras of the mobile devices (e.g., camera identification, camera properties, camera capabilities, etc.).

Figure 9:
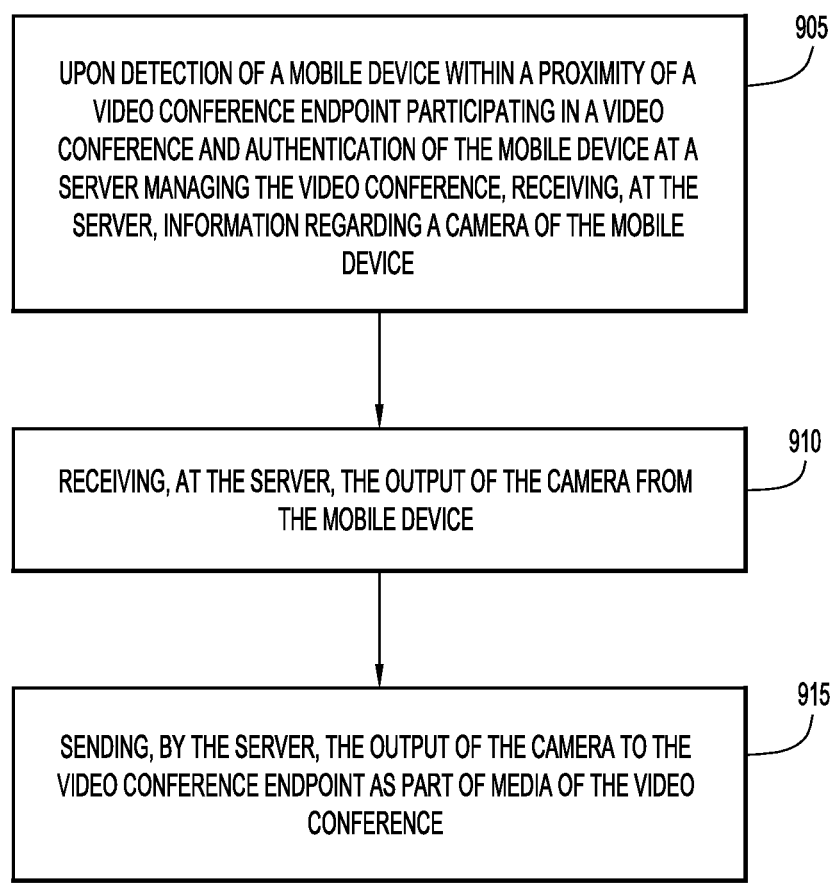
FIG. 9 is a flowchart of a method of dynamically adding, to the video conference system, the camera of a mobile device in proximity to a video conference endpoint, according to an example embodiment.

With reference to FIG. 9, illustrated is a flowchart of a method 900 performed by the video conference server 102 for receiving and sending media output of a camera of a mobile device proximate to a video conference endpoint 104 to at least one endpoint participating in a collaboration session. Reference is also made to FIGS. 1-7 for purposes of the description of FIG. 9. At 905, the video conference server 102 receives information regarding the camera of the mobile device that has been detected as being within a proximity of the video conference endpoint 104 and has been authenticated. As previously explained, the information received by the video conference server 102 regarding the camera of the mobile device 204 includes an announcement of the camera 206 of the mobile device 204 that is available for use during the video conference session and the encoding capabilities of the mobile device 204 for the media output of the camera 206. At 910, the video conference server 102 receives, from the mobile device 204 the media output of the camera of the mobile device 204. The media output of the mobile device 204 may be a video output or an image. At 915, the video conference server 102 sends the media output of the camera 206 of the mobile device 204 to the video conference endpoint 104 as part of media of the video conference session. The video conference server 102 may also send the media output of the camera 206 of the mobile device 204 to any other one or more far-end endpoints 104 that are participating in the video conference session.

In summary, participants at a video conference endpoint of a video conference session often bring their mobile devices with them to the video conference session. These mobile devices are often equipped with one or more cameras that could be utilized during the video conference session to provide views that cannot be easily captured by the cameras of the video conference endpoint. According to one embodiment, presented herein is a method for dynamically adding a camera of a mobile device as an additional media source for a video conference session, where the mobile device is detected as being in proximity of a video conference endpoint. The additional media source of the camera of a mobile device may be utilized to provide views previously unavailable to the participants of the video conference session, such as a close-up view of a document or a close-up view of an object, or perhaps a close-up view of a person's face.

In one form, a method is provided comprising: upon detection of a mobile device within a proximity of a video conference endpoint and authentication of the mobile device at a server managing the video conference endpoint, receiving, at the server, information regarding a camera of the mobile device; receiving, at the server, the output of the camera from the mobile device; and sending, by the server, the output of the camera to the video conference endpoint as part of media to be presented by the video conference endpoint.

In another form, an apparatus is provided comprising: a network interface unit that enables communication over a network; and a processor coupled to the network interface unit, the processor configured to: upon detection of a mobile device within a proximity of a video conference endpoint and authentication of the mobile device, receive information regarding a camera of the mobile device; receive the output of the camera from the mobile device; and send the output of the camera to the video conference endpoint as part of media to be presented by the video conference endpoint.

In yet another form, a (non-transitory) processor readable medium is provided. The medium stores instructions that, when executed by a processor, cause the processor to: upon detection of a mobile device within a proximity of a video conference endpoint and authentication of the mobile device, receive information regarding a camera of the mobile device; receive the output of the camera from the mobile device; and send the output of the camera to the video conference endpoint as part of media to be presented by the video conference endpoint.

The above description is intended by way of example only. Various modifications and structural changes may be made therein without departing from the scope of the concepts described herein and within the scope and range of equivalents of the claims.

What is claimed is:

1. A method comprising:
   upon detection of a mobile device within a proximity of a primary video conference endpoint by the primary video conference endpoint emitting a proximity signal that is received by the mobile device, and upon authentication of the mobile device at a server managing a collaboration session between the primary video conference endpoint and one or more secondary video conference endpoints, receiving, at the server, information regarding a camera of the mobile device;

receiving, at the server, a request from the primary video conference endpoint for an output of the camera of the mobile device;

requesting, by the server, the output of the camera from the mobile device;

receiving, at the server, the output of the camera of the mobile device directly from the mobile device; and sending, by the server, the output of the camera to the primary video conference endpoint and the one or more secondary video conference endpoints as part of media to be presented by the primary video conference endpoint and the one or more secondary video conference endpoints.

2. The method of claim 1, wherein the output of the camera is a video output or an image.

3. The method of claim 1, wherein information regarding the camera includes an announcement of the camera by the mobile device and encoding capabilities of the mobile device for the output of the camera.

4. The method of claim 3, wherein the output of the of the camera of the mobile device is encoded by the mobile device prior to the server receiving the output.

5. The method of claim 1, wherein the primary video conference endpoint emitting a proximity signal is one or more of:

the primary video conference endpoint playing ultrasound tones that are received by the mobile device;

the primary video conference endpoint outputting short-range wireless signals received by the mobile device; or the primary video conference endpoint using an indoor positioning system to estimate a location of the mobile device.

6. The method of claim 1, wherein the mobile device is a first mobile device, the camera is a first camera, and the first mobile device including one or more additional cameras, and further comprising:

upon detection of one or more additional mobile devices within the proximity of the primary video conference endpoint and authentication of the one or more additional mobile devices at the server managing the video conference endpoint, receiving, at the server, information regarding cameras of the one or more additional mobile devices; and receiving, at the server, a request from the primary video conference endpoint for an output of a selected camera of the one or more additional mobile devices;

requesting, by the server, the output of the selected camera from the one or more additional mobile devices;

receiving, at the server, the output of the selected camera from the one or more additional mobile devices; and sending, by the server, the output of the selected camera to the primary video conference endpoint and the one or more secondary video conference endpoints.

7. The method of claim 1, wherein the proximity signal includes a network address of the server.

8. An apparatus comprising:
a network interface unit that enables communication over a network; and
a processor coupled to the network interface unit, the processor configured to:
upon detection of a mobile device within a proximity of a primary video conference endpoint by the primary video conference endpoint emitting a proximity signal that is received by the mobile device, and upon authentication of the mobile device, receive information regarding a camera of the mobile device;
receive a request from the primary video conference endpoint for an output of the camera of the mobile device;
request the output of the camera from the mobile device;
receive the output of the camera of the mobile device directly from the mobile device; and
send the output of the camera to the primary video conference endpoint and one or more secondary video conference endpoints participating in a collaboration session with the primary video conference endpoint as part of media to be presented by the primary video conference endpoint and the one or more secondary video conference endpoints.

9. The apparatus of claim 8, wherein the output of the camera is a video output or an image.

10. The apparatus of claim 8, wherein information regarding the camera includes an announcement of the camera by the mobile device and encoding capabilities of the mobile device for the output of the camera.

11. The apparatus of claim 10, wherein the output of the of the camera of the mobile device is encoded by the mobile device prior to the apparatus receiving the output.

12. The apparatus of claim 8, wherein the primary video conference endpoint emitting a proximity signal is one or more of:

the primary video conference endpoint playing ultrasound tones that are received by the mobile device;

the primary video conference endpoint outputting short-range wireless signals received by the mobile device; or the primary video conference endpoint using indoor positioning to estimate a location of the mobile device.

13. The apparatus of claim 8, wherein the mobile device is a first mobile device, the camera is a first camera, and the first mobile device including one or more additional cameras, and the processor is further configured to:

upon detection of one or more additional mobile devices within the proximity of the primary video conference endpoint and authentication of the one or more additional mobile devices, receive information regarding cameras of the one or more additional mobile devices; and receive a request from the primary video conference endpoint for an output of a selected camera of the one or more additional mobile devices;

request the output of the selected camera from the one or more additional mobile devices;

receive the output of the selected camera from the one or more additional mobile devices; and send the output of the selected camera to the primary video conference endpoint and the one or more secondary video conference endpoints.

14. The apparatus of claim 8, wherein the proximity signal includes a network address of the apparatus.

15. A non-transitory processor readable medium storing instructions that, when executed by a processor, cause the processor to:
upon detection of a mobile device within a proximity of a primary video conference endpoint by the primary video conference endpoint emitting a proximity signal that is received by the mobile device, and upon authentication of the mobile device, receive information regarding a camera of the mobile device;
receive a request from the primary video conference endpoint for an output of the camera of the mobile device;
request the output of the camera from the mobile device;
receive the output of the camera of the mobile device directly the mobile device; and
send the output of the camera to the primary video conference endpoint and one or more secondary video conference endpoints participating in a collaboration session with the primary video conference endpoint as part of media to be presented by the primary video conference endpoint and the one or more secondary video conference endpoints.

16. The non-transitory processor readable medium of claim 15, wherein the output of the camera is a video output or an image.

17. The non-transitory processor readable medium of claim 15, wherein information regarding the camera includes an announcement of the camera by the mobile device and encoding capabilities of the mobile device for the output of the camera.

18. The non-transitory processor readable medium of claim 17, wherein the output of the of the camera of the mobile device is encoded by the mobile device prior to the processor receiving the output.

19. The non-transitory processor readable medium of claim 15, wherein the primary video conference endpoint emitting a proximity signal is one or more of:
the primary video conference endpoint playing ultrasound tones that are received by the mobile device;
the primary video conference endpoint outputting short-range wireless signals received by the mobile device; or
the primary video conference endpoint using indoor positioning to estimate a location of the mobile device.

20. The non-transitory processor readable medium of claim 15, wherein the proximity signal includes a network address of a video conference server that includes the processor.

* * * * *